United States Patent
Medina Juarez et al.

(10) Patent No.: US 11,692,521 B2
(45) Date of Patent: Jul. 4, 2023

(54) FITTING CONNECTION ASSEMBLY FOR A FLUID DELIVERY SYSTEM

(71) Applicant: Robert Bosch GmbH, Stuttgart (DE)

(72) Inventors: Cesar Omar Medina Juarez, San Luis Potosi (MX); Luis Humberto Guzman Trevino, Tamaulipas (MX); John Casari, Manchester, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/469,477

(22) Filed: Sep. 8, 2021

(65) Prior Publication Data

US 2023/0076972 A1    Mar. 9, 2023

(51) Int. Cl.
| | | |
|---|---|---|
| *F02M 55/02* | (2006.01) | |
| *F16L 37/14* | (2006.01) | |
| *F02M 61/16* | (2006.01) | |
| *F02M 61/14* | (2006.01) | |

(Continued)

(52) U.S. Cl.
CPC ......... *F02M 55/004* (2013.01); *B05B 15/658* (2018.02); *F02M 55/005* (2013.01); *F02M 55/025* (2013.01); *F02M 61/14* (2013.01); *F02M 61/168* (2013.01); *F16L 37/146* (2013.01); *F16L 37/148* (2013.01); *F02M 2200/85* (2013.01); *F02M 2200/852* (2013.01);

(Continued)

(58) Field of Classification Search
CPC ......... F02M 2200/85; F02M 2200/852; F02M 2200/853; F02M 2200/856; F02M 55/004; F02M 55/005; F02M 55/025; F02M 61/14; F02M 61/168; F16L 37/14; F16L 37/142; F16L 37/146; F16L 37/148
See application file for complete search history.

(56) References Cited

U.S. PATENT DOCUMENTS

| | | | | |
|---|---|---|---|---|
| 2,506,286 A | * | 5/1950 | Wittlin | F16L 37/146 285/305 |
| 3,390,897 A | * | 7/1968 | Moore | F16L 15/006 403/287 |

(Continued)

FOREIGN PATENT DOCUMENTS

| | | | | |
|---|---|---|---|---|
| DE | 19755429 A1 | * | 6/1999 | ............ F16L 37/144 |
| DE | 10309058 A1 | * | 9/2004 | ............ F02M 61/16 |

(Continued)

*Primary Examiner* — John M Zaleskas
(74) *Attorney, Agent, or Firm* — Kelly McGlashen; Maginot, Moore & Beck LLP (57) ABSTRACT

A connection assembly is used to connect a first body to a second body. The first body includes a bore that is coaxial with a first axis, and a retainer opening that extends coaxially with a second axis. The second axis is perpendicular to the first axis and offset relative to the first axis. In addition, a portion of the retainer opening intersects the bore. The second body includes an insertion portion that is disposed in the bore, a fluid passage that extends through the insertion portion and communicates with the bore, and an outer surface of the second body has a channel. The connection assembly employs an elastic retaining pin that retains the insertion portion within the bore. The retaining pin is disposed in the retainer opening such that a portion of the retaining pin resides in the channel, and the retaining pin is self-aligning and self-retaining.

12 Claims, 7 Drawing Sheets

(51) Int. Cl.
*F02M 55/00* (2006.01)
*B05B 15/658* (2018.01)

(52) U.S. Cl.
CPC . *F02M 2200/853* (2013.01); *F02M 2200/856* (2013.01)

(56) References Cited

U.S. PATENT DOCUMENTS

| | | | | |
|---|---|---|---|---|
| 3,913,954 | A * | 10/1975 | Klimpl | F16L 37/144 |
| | | | | 285/305 |
| 3,973,791 | A * | 8/1976 | Porta | F16L 33/2073 |
| | | | | 285/305 |
| 4,153,281 | A | 5/1979 | Ahlstone | |
| 4,331,317 | A * | 5/1982 | Kamai | F02M 51/08 |
| | | | | 239/585.5 |
| 4,346,846 | A * | 8/1982 | Eblen | F02M 55/005 |
| | | | | 239/533.3 |
| 4,431,218 | A * | 2/1984 | Paul, Jr. | F16L 37/144 |
| | | | | 285/305 |
| 4,519,638 | A * | 5/1985 | Yodoshi | F16L 25/08 |
| | | | | 285/305 |
| 4,537,427 | A * | 8/1985 | Cooke | F16L 37/144 |
| | | | | 285/305 |
| 4,570,602 | A | 2/1986 | Atkins et al. | |
| 4,570,980 | A * | 2/1986 | Goward | F16L 37/144 |
| | | | | 285/305 |
| 5,092,300 | A * | 3/1992 | Imoehl | F02M 69/465 |
| | | | | 123/456 |
| 5,197,435 | A | 3/1993 | Mazur et al. | |
| 5,239,964 | A * | 8/1993 | Diener | F16L 39/005 |
| | | | | 123/456 |
| 5,301,647 | A | 4/1994 | Lorraine | |
| 5,511,527 | A | 4/1996 | Lorraine et al. | |
| 5,513,613 | A * | 5/1996 | Taylor | F02M 69/465 |
| | | | | 123/456 |
| 5,553,902 | A | 9/1996 | Powers | |
| 5,934,254 | A * | 8/1999 | Vetters | F02M 61/14 |
| | | | | 123/470 |
| 6,082,333 | A * | 7/2000 | Vattelana | F02M 69/465 |
| | | | | 123/456 |
| 6,149,206 | A * | 11/2000 | DiRocco | F16L 37/144 |
| | | | | 285/305 |
| 6,186,121 | B1 | 2/2001 | Uematsu et al. | |
| 6,250,691 | B1 * | 6/2001 | Taylor | F16L 37/1225 |
| | | | | 285/305 |
| 6,286,768 | B1 * | 9/2001 | Vetters | F02M 61/168 |
| | | | | 239/533.2 |
| 6,644,568 | B1 * | 11/2003 | Porter | F02M 61/168 |
| | | | | 239/585.4 |
| 6,869,080 | B2 | 3/2005 | Janoff et al. | |
| 7,318,418 | B2 | 1/2008 | Usui et al. | |
| 7,363,913 | B2 | 4/2008 | Dutt et al. | |
| 7,419,189 | B2 | 9/2008 | Dickerson et al. | |
| 7,469,680 | B2 | 12/2008 | Merchant et al. | |
| 7,628,140 | B2 | 12/2009 | Trubnikov | |
| 8,844,500 | B2 | 9/2014 | Bedekar et al. | |
| 9,567,961 | B2 | 2/2017 | Cass et al. | |
| 9,797,355 | B2 | 10/2017 | Reinhardt et al. | |
| 9,810,189 | B2 | 11/2017 | Maier et al. | |
| 9,957,938 | B2 | 5/2018 | Roseborsky et al. | |
| 10,202,954 | B2 | 2/2019 | Suzuki | |
| 10,208,723 | B2 | 2/2019 | Carey | |
| 10,648,439 | B2 | 5/2020 | Pohlmann et al. | |
| 10,655,584 | B2 | 5/2020 | Nishizawa et al. | |
| 10,801,457 | B1 * | 10/2020 | Masti | F02M 63/028 |
| 11,525,428 | B1 * | 12/2022 | Guzman Escalante | F16B 2/248 |
| 2004/0169371 | A1 * | 9/2004 | Hagiya | F16L 37/146 |
| | | | | 285/305 |
| 2006/0055171 | A1 * | 3/2006 | Parrott | F16L 37/53 |
| | | | | 285/276 |
| 2007/0052384 | A1 | 3/2007 | Hidaka et al. | |
| 2011/0108005 | A1 * | 5/2011 | Nishizawa | B23K 1/0008 |
| | | | | 228/159 |
| 2012/0031996 | A1 * | 2/2012 | Harvey | F02M 55/005 |
| | | | | 239/289 |
| 2013/0068198 | A1 * | 3/2013 | Maier | F02M 55/025 |
| | | | | 123/456 |
| 2014/0041635 | A1 * | 2/2014 | Keller | F02M 55/02 |
| | | | | 123/469 |
| 2015/0330347 | A1 * | 11/2015 | Pohlmann | F02M 61/168 |
| | | | | 239/408 |
| 2016/0025053 | A1 * | 1/2016 | Reinhardt | F16L 37/1225 |
| | | | | 285/91 |
| 2016/0076503 | A1 * | 3/2016 | Fischer | F02M 61/14 |
| | | | | 123/470 |
| 2016/0201628 | A1 * | 7/2016 | Sanftleben | F02M 61/168 |
| | | | | 123/478 |
| 2016/0273501 | A1 * | 9/2016 | Cass | F02M 69/465 |
| 2016/0333836 | A1 * | 11/2016 | Lang | F02M 61/14 |
| 2017/0138325 | A1 * | 5/2017 | Roseborsky | F02M 55/025 |
| 2017/0342950 | A1 * | 11/2017 | Carey | F02M 55/025 |
| 2019/0136812 | A1 * | 5/2019 | Rehwald | F02M 61/166 |
| 2021/0140398 | A1 * | 5/2021 | Masti | F02M 55/004 |
| 2021/0277860 | A1 * | 9/2021 | Kromer | F02M 55/025 |
| 2022/0307454 | A1 * | 9/2022 | Guzman Trevino | F02M 55/005 |

FOREIGN PATENT DOCUMENTS

| | | | | |
|---|---|---|---|---|
| DE | 102015210722 | A1 * | 12/2016 | F02M 47/027 |
| DE | 102019218990 | A1 * | 6/2021 | F02M 61/16 |
| EP | 1482169 | A2 * | 12/2004 | F02M 55/005 |
| EP | 1878963 | A2 * | 1/2008 | F16L 37/146 |
| JP | 2003343387 | A * | 12/2003 | |
| WO | WO-2005108773 | A1 * | 11/2005 | F02M 47/027 |
| WO | WO-2021194601 | A * | 9/2021 | F16L 37/146 |

* cited by examiner

FITTING CONNECTION ASSEMBLY FOR A FLUID DELIVERY SYSTEM

BACKGROUND

A fuel delivery system may include a fuel rail that is configured to supply fuel to the cylinders of an engine. The fuel rail is supplied with fuel by a fuel supply line that is connected to an inlet of the fuel rail. Although plastic fuel rails are known, metal fuel rails may be used to deliver fuel at high pressure, and include a main fuel supply pipe referred to as a "log". As used herein, the term "high pressure" refers to pressures greater than 250 bar. The log has an integral inlet that connects the fuel rail to the fuel line, a main fuel channel that communicates with the inlet. The connection of the inlet to the fuel line is a critical joint in high pressure fuel delivery systems. In addition, the fuel rail includes multiple injector cups that depend integrally from an outer surface of the log. The injector cups receive and support fuel injectors that inject fuel into the intake manifold or cylinders of an internal combustion engine. In some applications, the fuel rail may supply high-pressure fuel through the fuel injectors by directly injecting into corresponding engine cylinders. The connection of the fuel injector to the injector cup is another critical joint in high pressure fuel delivery systems.

Some conventional fuel delivery systems employ connections in which the fuel line retention features are coupled with sealing features using highly variable processes that are difficult to control. In addition, some conventional fuel delivery systems employ fuel line-to-fuel rail inlet connections having shapes and materials that require high precision in manufacture and assembly, which result in increased manufacturing complexity and cost. It is desirable to provide a connection between a high pressure fuel line and an inlet of a fuel rail in which retention features are de-coupled from the sealing features, and which have few parts and are relatively simple to manufacture. It is desirable to provide a connection between a high pressure fuel line and an inlet of a fuel rail in which changes in the internal pressure of the main fuel channel caused by injector delivery timing "pressure pulsations" are reduced or eliminated. In addition, it is desirable to provide a connection between an injector cup of a fuel rail and a fuel injector that provides a reliable connection and which has few parts and is relatively simple to manufacture.

SUMMARY

A fuel delivery system is provided that includes a connection between the fuel supply line and the fuel rail inlet that is achieved using an inlet fitting that decouples the retention function of the connection from the sealing function of the connection. The inlet fitting has a generally cylindrical leading end that is disposed in, and sealed with respect to, the main fuel channel of the fuel rail via a first O-ring seal. The trailing end of the inlet fitting is configured to be connected to the fuel supply line via a connector that provides a fluid-tight seal. The inlet fitting includes a fitting through passage that extends between the leading end and the trailing end, allowing fuel to be delivered from the fuel supply line to the main fuel channel of the fuel rail. The inlet fitting is secured to an inlet of the fuel rail via a self-retaining elastic retaining pin.

The fuel delivery system also includes a connection between an injector cup of the fuel rail and a fuel injector that is achieved in a way that decouples the retention function of the connection from the sealing function of the connection. The inlet end of the fuel injector is received within a bore of the injector cup, and the inlet end of the fuel injector has a fluid-tight with respect to the bore via a second O-ring seal. The fuel injector is retained within the injector cup via a pair of self-retaining elastic retaining pins.

In some aspects, a fitting connection assembly for use in a fluid delivery system includes a first body, a second body and a retaining pin that connects the first and second bodies. The first body includes a bore that is coaxial with a first axis, and a retainer opening that extends coaxially with a second axis. The second axis is perpendicular to the first axis and offset relative to the first axis. The second body includes an insertion portion that is disposed in the bore, a fluid passage that extends through the insertion portion and communicates with the bore, and an outer surface having a channel. The retaining pin retains the insertion portion within the bore, and includes a pin first end, a pin second end that is opposite the pin first end, and a pin longitudinal axis that extends through the pin first and second ends. The retaining pin is disposed in the retainer opening such that a portion of the retaining pin resides in the channel, and the retaining pin is elastically expandable and contractible in a direction perpendicular to the pin longitudinal axis.

In some embodiments, the retaining pin conforms to the dimensions of the retainer opening.

In some embodiments, a radially-outward spring force of the retaining pin serves to retain the retaining pin within the retainer opening.

In some embodiments, the first body is a fuel rail, and the second body is an inlet fitting of the fuel rail.

In some embodiments, the channel is linear.

In some embodiments, the first body is an injector cup of a fuel rail, and the second body is a fuel injector.

In some embodiments, the channel is annular.

In some embodiments, the retaining pin is self-retaining with respect to the retainer opening.

In some embodiments, the retaining pin is a spring pin.

In some embodiments, the retaining pin is a coiled spring pin having more than one coil when in an unloaded state, the more than one coil encircling the retaining pin longitudinal axis.

In some embodiments, the retaining pin damps vibration of the assembly.

In some embodiments, the channel is aligned with the retainer opening.

In some embodiments, the retainer opening includes a first retainer opening and a second retainer opening that is parallel to the first retainer opening, and disposed on an opposed side of the first axis relative to the first retainer opening. The retaining pin comprises a first pin disposed in the first retainer opening and a second pin disposed in the second retainer opening.

In some aspects, a fuel rail assembly includes a fuel rail, a fuel injector supported by the fuel rail and a retaining pin that retains the fuel injector in connection with the fuel rail. The fuel rail includes a log having a main fuel passage, and an injector cup that is disposed on an outer surface of the log. The injector cup includes a sidewall. An inner surface of the sidewall defines a blind bore that opens at one end of the injector cup, is coaxial with a first axis, and is in fluid communication with the main fuel passage. The sidewall defines a retainer opening that is coaxial with a second axis that is perpendicular to the first axis, and offset relative to the first axis. The fuel injector includes an injector housing having a fuel inlet end that is disposed in the bore, a fuel outlet end disposed opposite to the fuel inlet end, the fuel outlet end disposed outside of the bore, and an annular groove located between the fuel inlet end and a mid point of the injector housing. The groove is disposed in the bore. In addition, the fuel injector includes a seal that encircles an outer surface of the injector housing. The seal is disposed between the groove and the fuel inlet end. In addition, the seal is disposed in the bore and provides a fluid tight seal between the injector housing and a surface of the bore. The retaining pin is disposed in the retainer opening such that a portion of the retaining pin resides in the groove whereby the retaining pin retains the fuel inlet end of the fuel injector within the bore. The retaining pin includes a pin first end, a pin second end that is opposite the pin first end, and a pin longitudinal axis that extends through the pin first and second ends. The retaining pin is elastically expandable and contractible in a direction perpendicular to the pin longitudinal axis.

In some embodiments, the retainer opening includes a first retainer opening and a second retainer opening that is parallel to the first retainer opening, and disposed on an opposed side of the first axis relative to the first retainer opening. In addition, the retaining pin includes a first pin disposed in the first retainer opening and a second pin disposed in the second retainer opening. In some aspects, a fuel rail assembly includes a fuel rail, an inlet fitting and a retaining pin that retains the inlet fitting in an inlet passageway of the fuel rail. The fuel rail includes a main fuel passage, and an inlet disposed at one end of the main fuel passage, the inlet including the inlet passageway that permits communication between the environment and the main fuel passage. The inlet passageway and the main fuel passage are coaxial with a first axis. The fuel rail also includes a retainer opening that is disposed in the inlet and coaxial with a second axis that is perpendicular to the first axis. The inlet fitting includes a leading end disposed in the inlet passageway, and a trailing end opposite the leading end and disposed outside the fuel rail. The trailing end includes an external thread that is configured to engage an internal thread of a fluid delivery line. The inlet fitting includes a fitting longitudinal axis that extends between the leading end and the trailing end, and a fitting through passage that is co-linear with the fitting longitudinal axis and extends between the leading end and the trailing end. The fitting through passage communicates with the inlet passageway. In addition, the inlet fitting includes a channel that is parallel to the second axis, and a seal that surrounds the leading end and provides a fluid tight seal between the inlet fitting and a surface of the main fuel passage. The retaining pin is disposed in the retainer opening such that a portion of the retaining pin resides in the channel whereby the retaining pin retains the fuel inlet end of the fuel injector within the bore. The retaining pin is elastically expandable and contractible in a direction perpendicular to the second axis.

DETAILED DESCRIPTION

Referring to FIGS. 1-4, a fuel delivery system 1 includes a fuel rail 32 that is configured to supply fuel to multiple fuel injectors 80 that inject fuel directly into the cylinders of an internal combustion engine (not shown). The fuel rail 32 receives high pressure fuel from a high pressure fuel supply line 2. The fuel supply line 2 is connected to a fuel tank 15 via a high pressure fuel pump 12. The high pressure fuel pump 12 is connected via a low pressure line 3 to a low pressure fuel pump 13 (e.g., a "fuel sender") disposed inside the fuel tank 15. The fuel rail 32 includes an integral inlet 39 that is configured to be connected to the fuel supply line 2. As used herein, the term "integral" is defined as "being of the whole, being formed as a single unit with another part." In some embodiments, the fuel delivery system 1 is configured to deliver high pressure fuel to the fuel rail 32, which in turn delivers high pressure fuel to the fuel injectors 80.

The fuel delivery system 1 includes a fuel line connection assembly 30 that provides a fluid-tight mechanical connection between the high pressure fuel supply line 2 and the fuel rail 32. In particular, the fuel line connection assembly 30 provides a mechanical connection in which features that retain the fuel supply line 2 in the connected configuration with the fuel rail 32 are de-coupled from the features that provide a fluid tight seal, as discussed in detail below. In addition, the fuel line connection assembly 30 has a relatively few number of parts as compared to some conventional fuel line connectors, as discussed in detail below.

In addition, the fuel delivery system 1 includes a fuel injector connection assembly 68 that provides a fluid-tight mechanical connection between an injector cup 44 of the fuel rail 32 and the respective fuel injector 80. In particular, the fuel injector connection assembly 68 provides a mechanical connection in which features that retain the fuel injector 80 in the connected configuration with injector cup 44 of the fuel rail 32 are de-coupled from the features that provide a fluid tight seal, as discussed in detail below. In addition, the fuel injector connection assembly 68 has a relatively few number of parts as compared to some conventional fuel injector connectors, as discussed in detail below.

The high pressure fuel supply line 2 is configured to deliver high pressure fuel to the fuel rail 32. The high pressure fuel supply line 2 includes a thick-walled metal pipe 4 that terminates in a pipe connector 5. The pipe connector 5 includes a hollow, ball-shaped gland 6 that may be fixed to the open end of the pipe 4 in a sealed manner, or alternatively may be integrated into the pipe end shape. The gland 6 includes gland orifice 7. The open end of the pipe 4 is disposed inside the gland 6, and faces the gland orifice 7. The pipe connector 5 also includes a gland nut 8 having an internal thread 9. The pipe 4 extends through an open first end 10 of the gland nut 8 so that the gland 6 is disposed inside the gland nut 8. The gland orifice 7 faces an open second end 11 of the gland nut 8. Although the pipe 4 is movable relative to the gland nut 8, the gland nut first end 10 is dimensioned to prevent withdrawal of the gland 6, and thus also the pipe 4, from the gland nut first end 10. The internal thread 9 of the gland nut 8 engages an external thread 60 of the inlet fitting 50. In this configuration, the gland nut 8 is tightened to a specified torque to draw the gland 6 tightly to the inlet fitting 50 and form a fluid tight seal between the gland 6 and the inlet fitting 50, as discussed further below.

Figure 1:
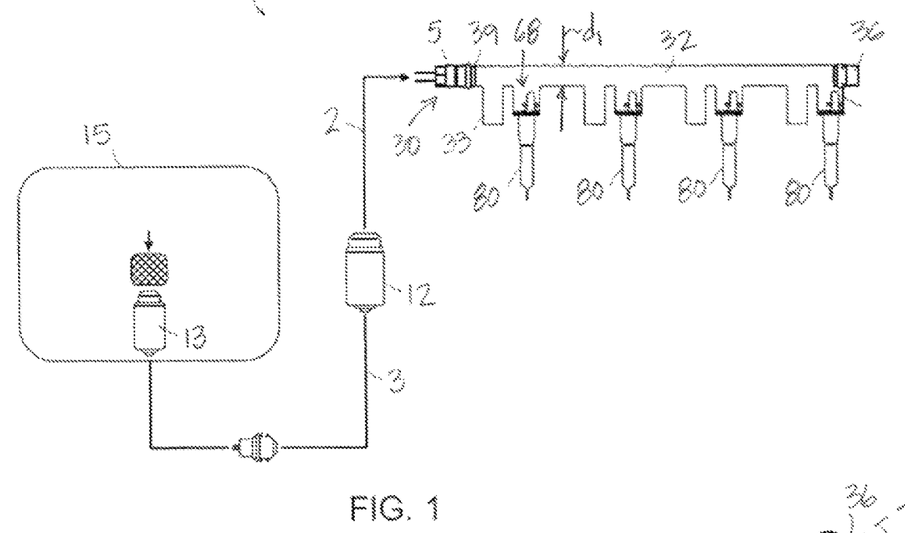
FIG. 1 is a schematic view of a fuel delivery system that includes a fuel rail that receives high pressure fuel from a fuel tank via a fuel supply line.
Figure 2:
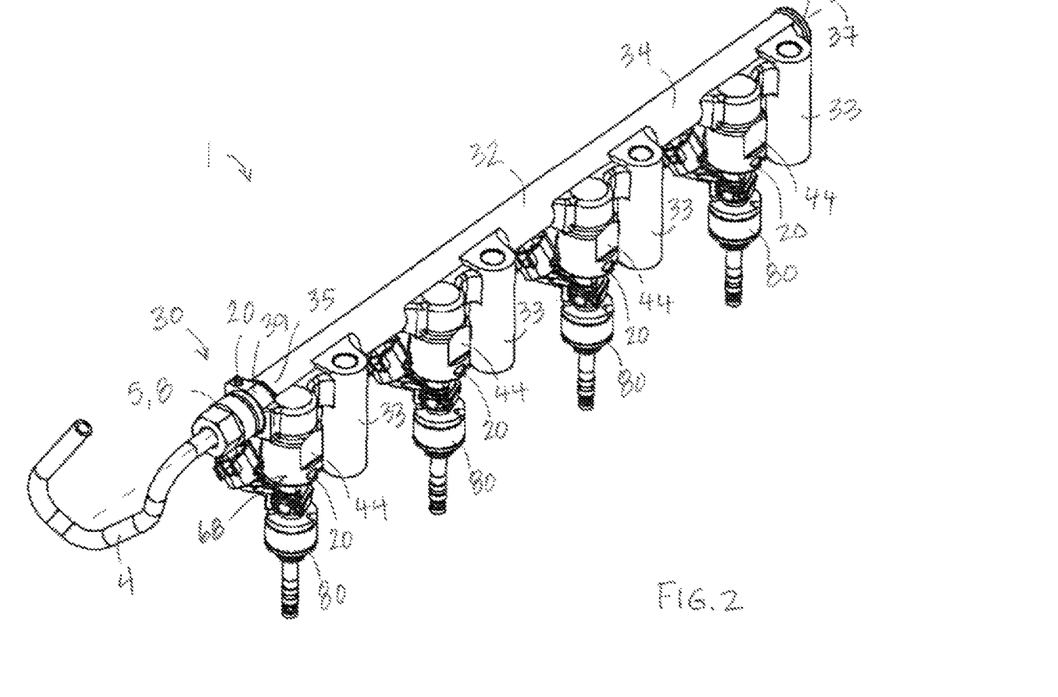
FIG. 2 is a perspective view of a portion of the fuel delivery system of FIG. 1, illustrating the fuel supply line connected to the fuel rail via a fuel line connection assembly.

The fuel rail 32 is configured to provide high-pressure distribution of fuel. The fuel rail 32 includes a log 34 and injector cups 44 that depend integrally from the log 34. The fuel rail also includes mounting bosses 33 that receive fasteners (not shown) that secure the fuel rail 32 to the vehicle engine.

The log 34 is an elongate hollow tube that provides a common rail or manifold. In the illustrated embodiment, the log 34 is cylindrical, but is not limited to having a cylindrical shape. The log 34 includes a log first end 35, a log second end 36 that is opposed to the log first end 35, and a fuel rail longitudinal axis 37 that extends between the log first and second ends 35, 36. The log 34 is thick walled to accommodate high fuel pressures, and an inner surface of the log defines the main fuel channel 38 through which fuel is supplied from the fuel tank 15 via the fuel pump 12. The centerline of the main fuel channel 38 coincides with the fuel rail longitudinal axis 37. The log material and dimensions are determined by the requirements of the specific application. For example, in some embodiments, the log 34 is a tube made of stainless steel, having a diameter d1 in the order of 10 mm to 30 mm and having a wall thickness ti in the order of 1.5 to 4 mm. In some embodiments, the log 34 may include a boss (not shown) configured to receive a pressure sensor. One end of the log 34, for example the log first end 35, is shaped to provide the inlet 39. In the illustrated embodiment, the opposed end of the log 34, for example the log second end 36, is closed.

The number of logs 34 included in the fluid delivery system 1 can be greater than one. For example, in some V-engine configurations, a log 34 is provided for each side of the V, and additional pipes 10 of the nature of fuel supply line 2 may be used to transfer fuel between the respective logs 34. In another example, a Y block for a V-engine configuration may have two pipes supplying fuel to respective logs, with the Y block being fed from the pump via a single pipe, where all pipes are of the nature of fuel supply line 2.

Figure 3:
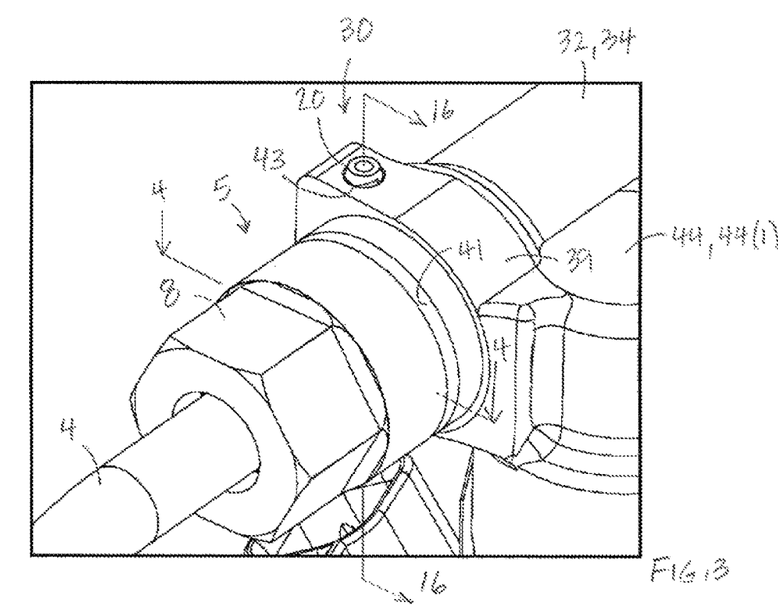
FIG. 3 is a perspective view of an enlarged portion of the fuel delivery system of FIG. 2, illustrating the fuel supply line connected to the fuel rail via a fuel line connection assembly.
Figure 4:
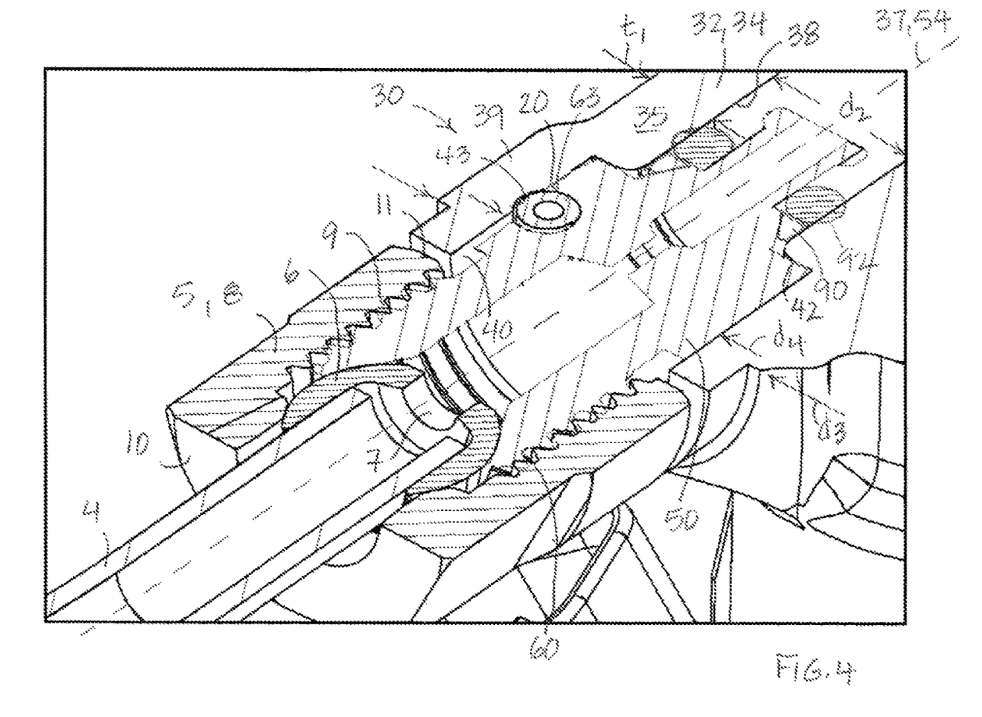
FIG. 4 is a cross-sectional view of the enlarged portion of the fuel delivery system of FIG. 2, as seen along line 4-4 of FIG. 3.

Referring to FIGS. 3 and 4, the fuel rail inlet 39 protrudes integrally from the log first end 35 in a direction parallel to the fuel rail longitudinal axis 37. The fuel rail inlet 39 is a hollow cylinder having an outer diameter d3 that is slightly greater than the outer diameter d1 of the log 34. In some embodiments, the fuel rail inlet 39 may include a flange (not shown) that protrudes in a direction perpendicular to the fuel rail longitudinal axis 37 and extends continuously or discontinuously about the circumference of the fuel rail inlet 39. However, in the illustrated embodiment, the flange has been omitted.

An inner surface of the fuel rail inlet 39 defines an inlet passageway 40 that extends between the inlet outer end 41 and the fuel rail main fuel channel 38. The inlet outer end 41 is open, whereby the inlet passageway 40 permits communication between the main fuel channel 38 and the environment. The inlet passageway 40 is coaxial with the inlet outer surface and adjoins, and opens to, the inlet outer end 41. In addition, the inlet passageway 40 is coaxial with the fuel rail longitudinal axis 37, and has an outer diameter d4 that is greater than the diameter d2 of the main fuel channel 38. In addition, an inner surface of the fuel rail inlet 39 includes a shoulder 42 at the transition in diameters between the inlet passageway 40 and the main fuel channel 38.

In the illustrated embodiment, a portion of an outer surface of the inlet 39 has a rectangular profile when the inlet 39 is viewed in a direction parallel to the fuel rail longitudinal axis 37. The inlet 39 includes an inlet retainer opening 43. The inlet retainer opening 43 is configured to receive an elastic retaining pin 20, as discussed in detail below. The inlet retainer opening 43 is a through opening that extends in a direction perpendicular to the fuel rail longitudinal axis 37. The inlet retainer opening 43 is offset relative to the fuel rail longitudinal axis, and partially intersects the inlet passageway 40. In the illustrated embodiment, the inlet retainer opening 43 is disposed on a side of the fuel rail that is opposite that of the mounting bosses 33 and the injector cups 44. This radial orientation of the retainer opening and elastic pin system can be located rotated about the rail longitudinal axis 37 as needed by the application for fitting to the engine environment or for easing assemble purposes.

Referring to FIGS. 2, 5 and 7-9, the injector cups 44 are disposed on an outer surface of the log 34. In the illustrated embodiment, the injector cups 44 protrude integrally from the log 34 and are spaced apart along the log outer surface in a direction parallel to the fuel rail longitudinal axis 37. Each injector cup 44 is configured to distribute pressurized fuel to a respective individual cylinder of the engine via a fuel injector 80. To this end, each injector cup 44 communicates with the main fuel channel 38 of the log 34 via an internal fuel passage (not shown).

The number of injector cups 44 that protrude from the log 34 depends on the engine configuration. For example, when a four-cylinder engine is used, the log 34 is provided with four injector cups 44 that are spaced apart long the fuel rail longitudinal axis 37, and when a straight-six engine is used, the log 34 is provided with six injector cups 44 that are spaced apart long the fuel rail longitudinal axis 37.

Each injector cup 44 is a cup-shaped structure, and includes a cylindrical sidewall 45. An inner surface of the sidewall 45 defines a bore 48. Each injector cup 44 includes a proximal end 44(1) that protrudes from log outer surface and closes one end of the sidewall 45, and a distal end 44(2) that is opposite the proximal end 44(1). A centerline 47 of the sidewall 45 extends through the injector cup proximal and distal ends 44(1), 44(2), and, in the illustrated embodiment, is perpendicular to the longitudinal axis 37 of the fuel rail 32. The bore 48 intersects the distal end 44(2). In particular, the bore 48 includes an open end 48(1) that coincides with the distal end 44(2), and a blind end 48(2) that is disposed between the bore open end 48(1) and the injector cup proximal end 44(1). In applications in which the fuel rail 32 is mounted above a cylinder block of the engine, the injector cups 44 open downward.

The injector cups 44 each include a pair of injector retainer openings 46. Each injector retainer opening 46 is configured to receive an elastic retaining pin 20. Each injector retainer opening 46 has a uniform diameter and extends in a direction perpendicular to the sidewall centerline 47 and to the fuel rail longitudinal axis 37. The injector retainer openings 46 are offset from the sidewall centerline 47 and are disposed on opposed sides of the sidewall centerline 47. In addition, each injector retainer opening 46 intersects the bore 48 at a location that is closer to the distal end 44(2) than the proximal end 44(1).

Each injector cup 44 is configured to receive an inlet end 81 of a fuel injector 80. The fuel injector 80 may be a high pressure device used for direct injection into a cylinder of a gasoline engine. The fuel injector 80 may include an elongate, generally tubular injector housing 84 that supports an injector valve (not shown). The inlet end 81 of the injector housing 84 provides a fuel connection nipple that is surrounded by a circumferentially-extending O-ring injector seal 85. The injector seal 85 forms a fluid-tight seal with an inner surface of the corresponding injector cup bore 48. The injector seal 85 cooperates with an inner surface of the bore 48 of the injector cup 44 to define the high pressure fuel distribution chamber 49 within the injector cup 44. In particular, the high pressure fuel distribution chamber 49 is defined within each injector cup 44 between the injector seal 85 and the bore blind end 48(2) so as to enclose the inlet end 81 of the injector housing 84. The outlet end 82 of the injector housing 84 is opposed to the inlet end 81, and provides a valve seat (not shown) and fuel spray opening or nozzle (not shown). In addition, at a location between the inlet end 81 and a mid portion of the injector housing 84, the injector housing 84 includes a necked portion 86 of reduced diameter.

Figure 7:
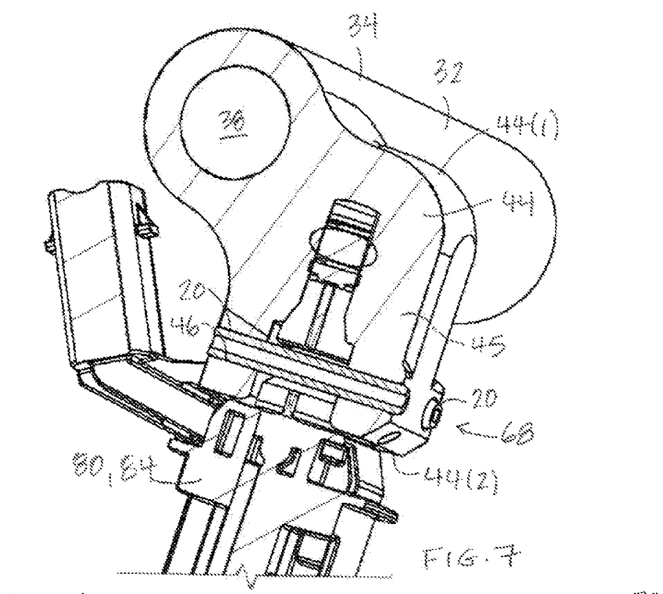
FIG. 7 is a cross-sectional view of an enlarged portion of the fuel delivery system of FIG. 2 illustrating the fuel injector connection assembly, as seen along line 7-7 of FIG. 5.
Figure 8:
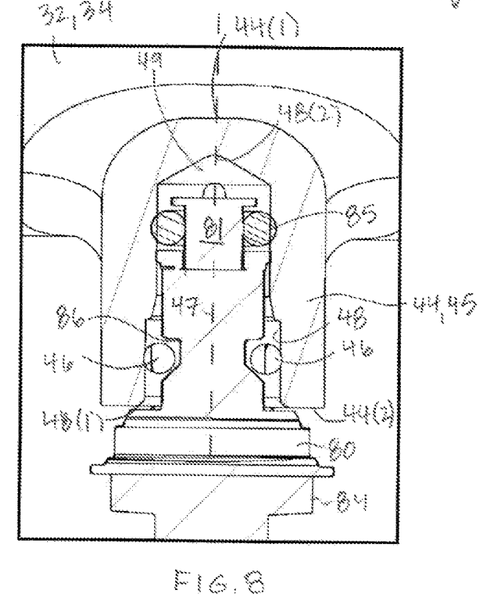
FIG. 8 is a cross-sectional view of an enlarged portion of the fuel delivery system of FIG. 2 illustrating the fuel injector connection assembly, as seen along line 8-8 of FIG. 5, and shown with the elastic retaining pins omitted.
Figure 9:
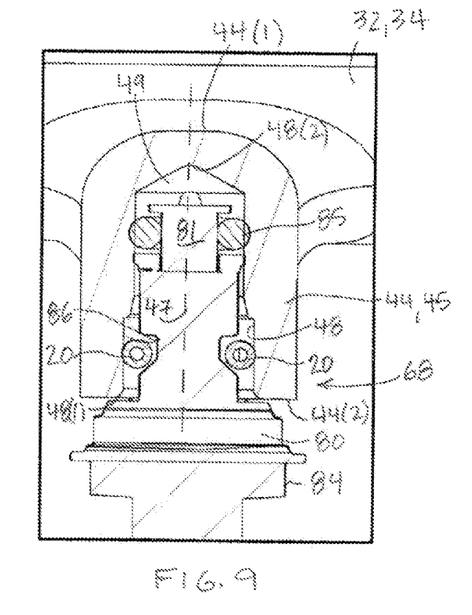
FIG. 9 is a cross-sectional view of an enlarged portion of the fuel delivery system of FIG. 2 illustrating the fuel injector connection assembly, as seen along line 8-8 of FIG. 5, and shown with the elastic retaining pins included.

Fuel is provided at high pressure to the fuel distribution chamber 49 of the injector cup 44 via the main fuel channel 38 of the log 34 and the fuel passageways of the respective injector cups 44. Thus high pressure fuel received in the fuel rail 32 is distributed directly into each cylinder of the engine via a respective injector cup 44 and fuel injector 80. The relative geometry of the log 34, injector cups 44 and fuel injectors 80 is complex, and is dependent on engine geometry and available space within the engine system.

Figures 5, 6:
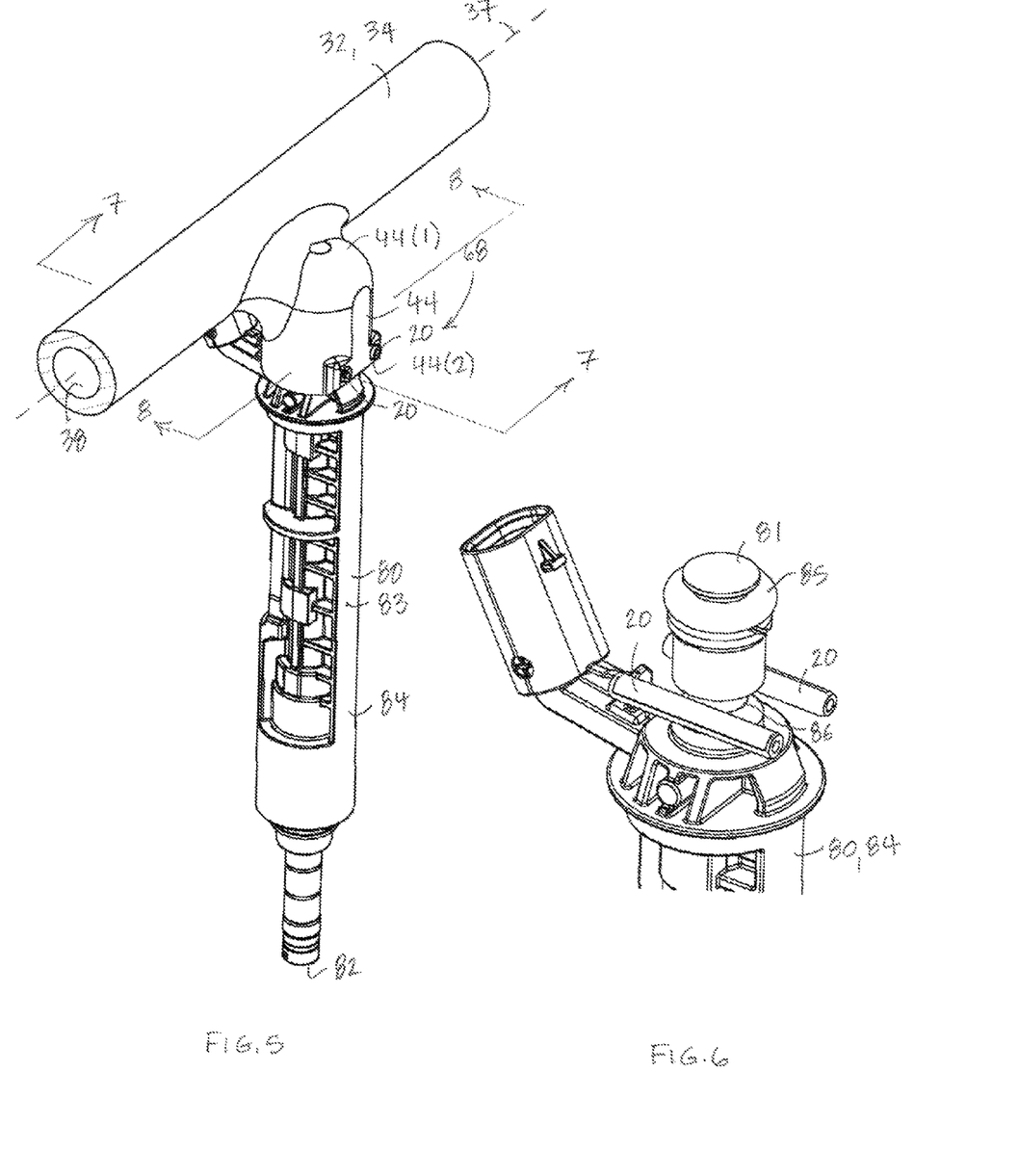
FIG. 5 is a perspective view of another portion of the fuel delivery system, illustrating a fuel injector connected to an injector cup via a fuel injector connection assembly.
FIG. 6 is a perspective view of an inlet end of a fuel injector, illustrating the elastic retaining pins used to retain the fuel injector on an injector cup, with the fuel rail including the injector cup omitted for clarity.

The fuel injector 80 is detachably secured to the injector cup 44 via the fuel injector connection assembly 68. The fuel injector connection assembly 68 includes the fuel injector 80, the respective injector cup 44 that receives and supports the fuel injector 80, and self-retaining elastic retaining pins 20 that are configured to retain the inlet end 81 of the fuel injector 44 within the bore 48 of the respective injector cup 44.

In the illustrated embodiment, the fuel injector 80 is detachably secured to the injector cup 44 via a pair of elastic retaining pins 20. In particular, an elastic retaining pin 20 is disposed in each injector retainer opening 46, whereby the elastic retaining pins 20 extend through the bore 48 and pass through the fuel injector housing necked portion 86. By this configuration, the elastic retaining pins 20 retain the fuel injector 80 within the bore 48.

Figure 10:
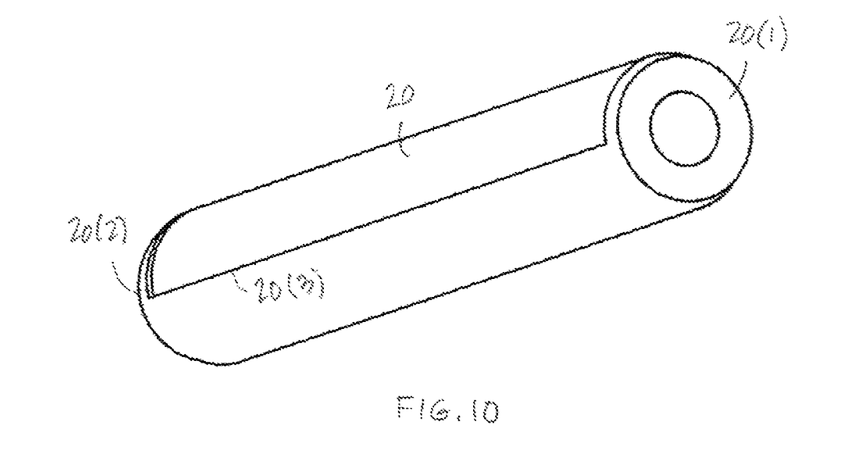
FIG. 10 is a perspective view of an elastic retaining pin.
Figure 11:
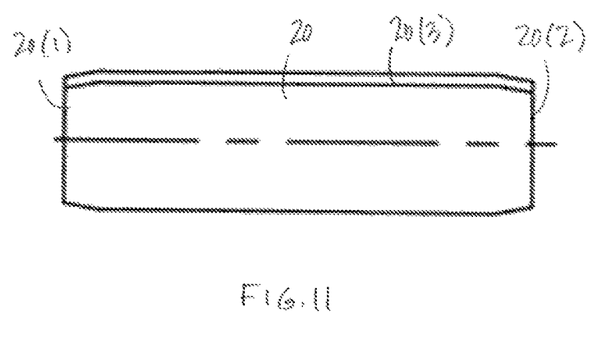
FIG. 11 is a side view of the elastic retaining pin of FIG. 10.
Figure 12:
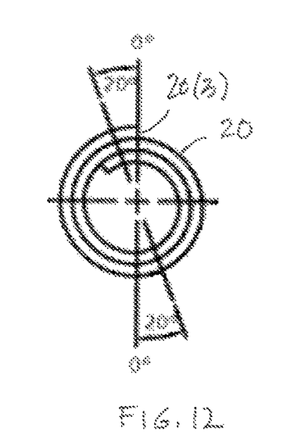
FIG. 12 is an end view of the elastic retaining pin of FIG. 10.

Referring to FIGS. 10-12, each elastic retaining pin 20 is a coiled spring pin, and may also be known as a roll spring pin or a spiral pin. A coiled spring pin is an engineered fastener manufactured by roll forming metal strip into a spiral cross section of two and one quarter (2.25) coils. Coiled spring pins have a body diameter larger than the diameter of the opening in which the elastic retaining pin 20 is received. In this application in which two pins 20 are used to secure a fuel injector 80 within an injector cup 44, the opening corresponds to the injector retainer opening 46. The spring action of the elastic retaining pin 20 allows it to compress to a smaller diameter for insertion into the injector retainer opening 46. The elastic retaining pin 20 assumes the diameter of the injector retainer opening 46 upon insertion. The radially-outward spring force of the elastic retaining pin 20 as it expands to fill the injector retainer opening 46 serves to retain the elastic retaining pin 20 within the injector retainer opening 46 during use. In addition, the elastic retaining pin 20 has chamfers on both ends 20(1), 20(2) to facilitate starting the pin 20 into the injector retainer opening 46. In some embodiments, the elastic retaining pins 20 are inserted into the injector retainer openings 46 with the seam 20(3) of the coil facing away from the fuel injector 80.

The coiled-type elastic retaining pins 20 fit tightly to the mating bore (e.g., injector retainer opening 46), are self-aligning by their rolled shape and self-retaining from their stored spring forces. The elastic retaining pins 20 continue to flex after insertion when a load is applied to the elastic retaining pins 20 thus providing excellent performance to counter fatigue and/or reduce vibration in dynamic applications. In the application in which the elastic retaining pins 20 are used to retain the fuel injector 80 within the injector cup 44, the elastic retaining pins 20 absorb energy of the loading of the injector from above due to fuel pressure and from below due to combustion pressure.

Depending on the requirements of the specific application, the elastic retaining pins 20 may be removed using common pin removal processes for servicing the injector from one or both ends of the injector retainer opening 46 (not shown). The elastic pins would then be substituted with new pins for reassembly.

Figure 13:
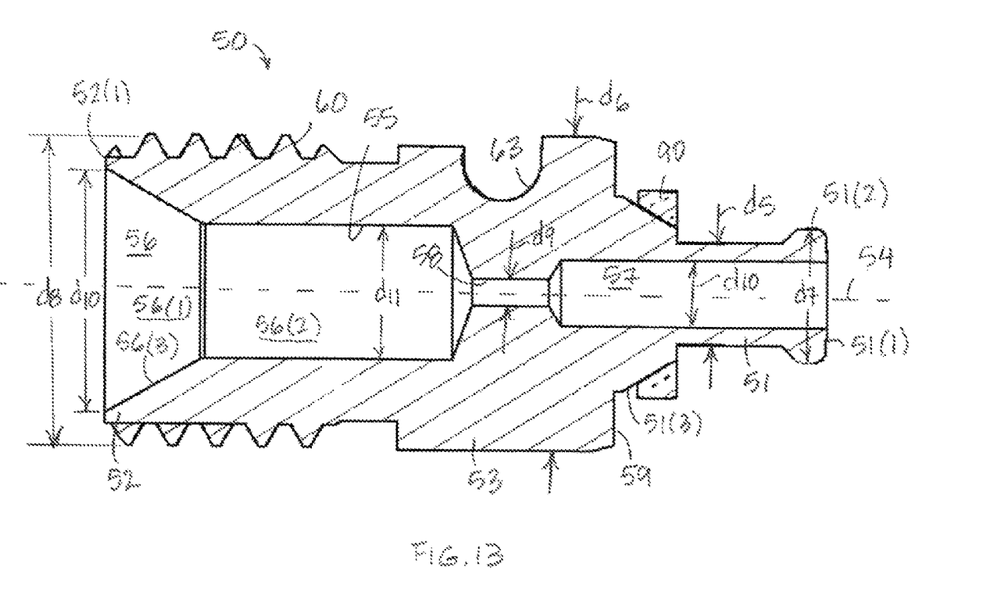
FIG. 13 is a cross-sectional view of an inlet fitting and backwasher.
Figure 14:
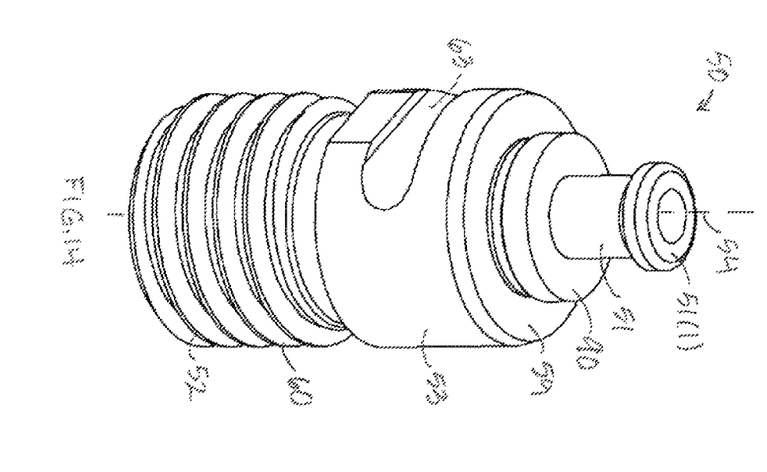
FIG. 14 is a perspective view of the inlet fitting and backwasher of FIG. 13.
Figure 15:
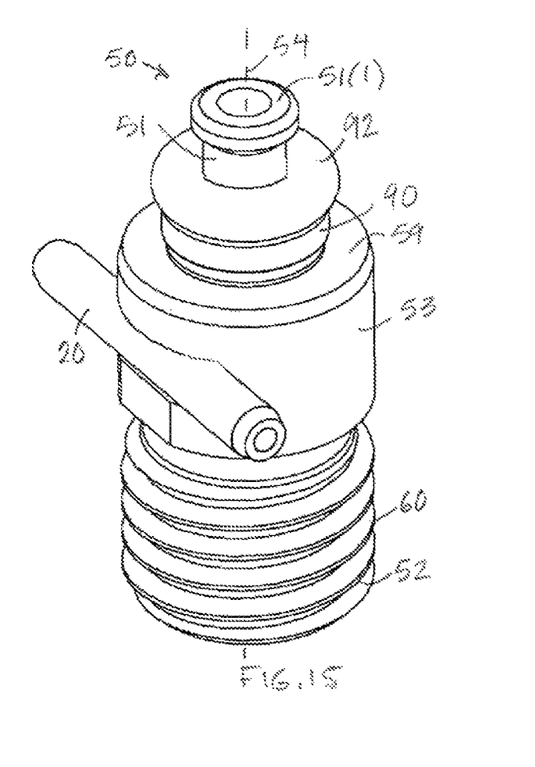
FIG. 15 is a perspective view of the inlet fitting and backwasher of FIG. 13, shown with the elastic retaining pin and O-ring seal.

Referring to FIGS. 13-15, the inlet fitting 50 is a metal part that provides a fluid-tight mechanical connection between the fuel supply line 2 and the fuel rail inlet 39. Generally, the inlet fitting 50 is a thick-walled hollow cylinder, and includes a leading end 51 that is configured to be received in the fuel rail main fuel channel 38, a trailing end 52 that is opposed to the leading end 51 and protrudes outside the fuel rail inlet 39, and an intermediate portion 53 disposed between the leading end 51 and the trailing end 52. The inlet fitting 50 includes a fitting longitudinal axis 54 that extends between the leading end 51 and the trailing end 52. When the inlet fitting 50 is assembled with the fuel rail inlet 39, the fitting longitudinal axis 54 is co-linear with the fuel longitudinal axis 37.

The leading end 51 extends into the main fuel channel 38 with a sliding clearance fit. The leading end 51 is generally cylindrical and, and terminates in an end face 51(1) that is perpendicular to the fitting longitudinal axis 54. In addition, the leading end 51 includes an enlarged diameter portion 51(2) that adjoins the end face 51(1) of the leading end 51. The outer diameter d5 of the leading end 51, as well as outer diameter d7 of the enlarged diameter portion 51(2), are smaller than the outer diameter d6 of the intermediate portion 53, and a bevel 51(3) is provided at the intersection of an external shoulder 59 and the leading end 51. The bevel 51(3) cooperates with a beveled inner surface of a backwasher 90 that surrounds the leading end 51. The backwasher 90 and the leading end enlarged diameter portion 51(2) limit the axial translation of an O-ring fitting seal 92 that encircles the leading end 51. In use, the fitting seal 92 provides a fluid-tight seal between the leading end 51 and the surface of the main fuel channel 38.

The intermediate portion 53 is dimensioned to be disposed in the inlet passageway 41 of the fuel rail inlet 39 with a location clearance fit. The intermediate portion 53 is cylindrical and free of an external thread. The outer diameter d6 of the intermediate portion 53 corresponds to, or is slightly less than, the inner diameter d4 of the inlet passageway 40. The intermediate portion 53 includes an inlet fitting retainer groove 63 in the outer surface thereof. The inlet fitting retainer groove 63 extends linearly, is perpendicular to the fitting longitudinal axis 54 and is offset relative to the fitting longitudinal axis 54.

An outer surface of the inlet fitting 50 includes the external shoulder 59 at the transition in diameters between the leading end 51 and intermediate portion 53. The external shoulder 59 of the inlet fitting 50 abuts the internal shoulder 42 of the fuel rail inlet 39, preventing over-insertion of the inlet fitting 50 with respect to the inlet 39.

The trailing end 52 adjoins the intermediate portion 53, and is cylindrical. An outer surface of the trailing end 52 includes an external thread 60 that is configured to engage the internal thread 9 of the gland nut 8 of the fuel supply line 2. In the illustrated embodiment, the outer diameter d8 of the external thread 60 is approximately the same as the outer diameter d6 of the intermediate portion 53, but is not limited to this configuration.

The inlet fitting 50 includes a through passage 55 that extends between the leading end 51 and the trailing end 52 and is co-linear with the fitting longitudinal axis 54. The diameter of the through passage 55 is irregular along the fitting longitudinal axis 54. In particular, the through passage 55 includes an entrance cavity 56 that opens at the end face 52(1) of the trailing end 52, and an exit cavity 57 that opens at the end face 51(1) of the leading end 51. The through passage 55 includes a reduced diameter portion that separates the entrance cavity 56 from the exit cavity 57, and defines a cylindrical damping channel 58.

The entrance cavity 56 is disposed between the end face 52(1) of the trailing end 52 and the damping channel 58. The entrance cavity 56 includes a conical portion 56(1) that opens at the trailing end end face 52(1), and a cylindrical portion 56(2) that extends between the conical portion 56(1) and the damping channel 58. The conical portion 56(1) has a conical profile that tapers so as to have a minimum diameter at the intersection with the cylindrical portion 56(2). In the illustrated embodiment, the conical surface 56(3) of the entrance cavity conical portion 56(1) is at an angle of 60 degrees+/−2 degrees relative to the inlet fitting longitudinal axis 54, but other angles may be employed as required by the application. In use, the conical portion 56(1) receives the spherical gland 6 of the fuel supply line 2, and the gland 6 abuts the conical surface 56(3). Upon sufficient tightening of the gland nut 8, a fluid tight seal is formed between the gland 6 and the conical surface 56(3), whereby fuel delivered through the supply line 2 is directed into the damping channel 58 via entrance cavity cylindrical portion 56(2). By this configuration, fluid is directed from the pipe 4 into the inlet fitting through passage 55 and then into the fuel rail main fuel channel 38. In some embodiments, the hardness of the inlet fitting 50 is greater than the hardness of the gland 6, whereby the gland 6 may be deformed during formation of the seal.

The exit cavity 57 is disposed between the damping channel 58 and the end face 51(1) of the leading end 51. The exit cavity 57 has a cylindrical profile that opens at the leading end end face 51(1). The longitudinal dimension of the exit cavity 57 is approximately two-thirds the longitudinal dimension of the entrance cavity 56, and is about one third of the overall longitudinal dimension of the inlet fitting 50.

The damping channel 58 is concentric with the fitting longitudinal axis 54, has a longitudinal dimension that is greater than its diameter d9. The damping channel 58 is configured to dampen pulse frequencies of the pressurized fuel passing there through. For example, the diameter d9 and longitudinal dimension of the damping channel 58 may be selected (e.g., tuned) to reduce pulsation frequency of the fuel. In the illustrated embodiment, the diameter d9 of the damping channel 58 is less than the diameter d10 of the exit cavity 57, which in turn, is less than the diameter d11 of the entrance cavity cylindrical portion 56(2).

Referring to FIGS. 3-4 and 16-17, the inlet fitting 50 is detachably secured to the fuel rail inlet 39 via the fuel line connection assembly 30. The fuel line connection assembly 30 includes the fuel line 4 that terminates in the pipe connector 5, the inlet fitting 50 that is connected to the fuel line 4 via the pipe connector 5, the inlet 39 of the fuel rail 32, and a self-retaining elastic retaining pin 20 that is configured to retain the inlet fitting 50 within the inlet passageway 40 of the inlet 39.

Figure 16:
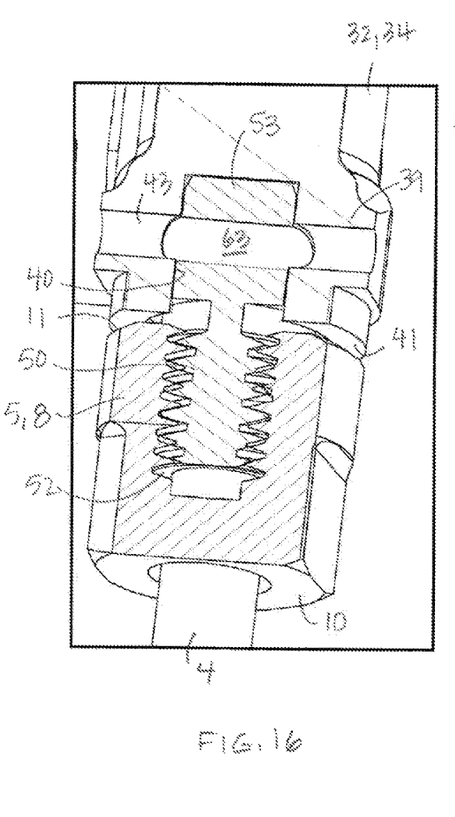
FIG. 16 is a cross-sectional view of the enlarged portion of the fuel delivery system of FIG. 2, as seen along line 16-16 of FIG. 3, and shown with the elastic retaining pin omitted.
Figure 17:
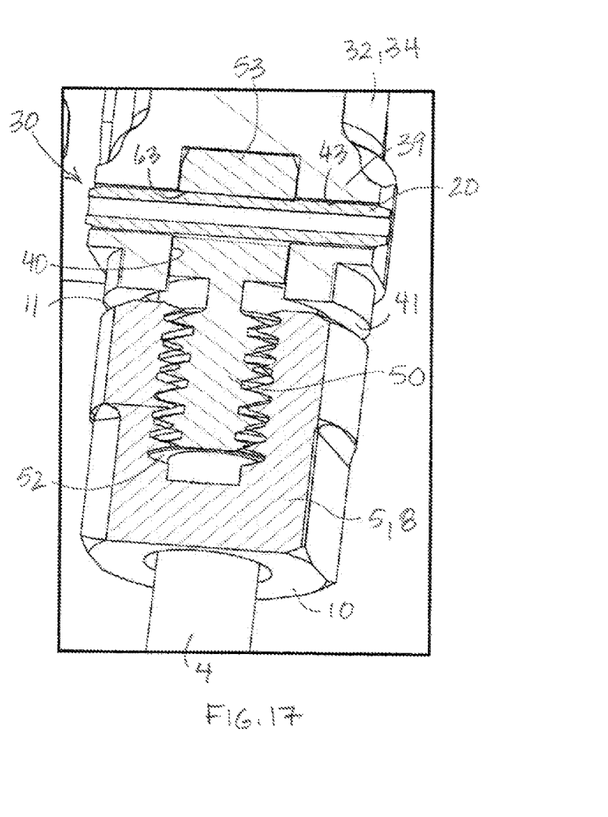
FIG. 17 is a cross-sectional view of the enlarged portion of the fuel delivery system of FIG. 2, as seen along line 16-16 of FIG. 3, and shown with the elastic retaining pin included.

In the illustrated embodiment, the inlet fitting 50 is disposed in the inlet passageway 40 in such a way that the inlet fitting leading end 51 is disposed in the main fuel channel 38 and the inlet fitting intermediate portion 53 is disposed in the inlet passageway 40. In particular, the O-ring seal 92 that encircles the inlet fitting leading end 51 forms a fluid-tight seal with the surface of the fain fuel channel 38, and the external shoulder 59 of the inlet fitting 50 faces the internal shoulder 42 of the inlet 39. In addition, the inlet fitting 50 is oriented such that the inlet fitting groove 63 faces the inlet retainer opening 43. Together, the inlet fitting groove 63 and the inlet retainer opening 43 cooperate to provide a through passage within the inlet 39 that receives an elastic retaining pin 20.

As discussed above with respect to retention of the fuel injector 80, the elastic retaining pin 20 is a coiled spring pin. In the application in which the elastic retaining pin 20 retains the inlet fitting 50 in the inlet 39, the opening corresponds to the inlet retainer opening 43. The spring action of the elastic retaining pin 20 allows it to compress to a smaller diameter for insertion into the inlet retainer opening 43. The elastic retaining pin 20 assumes the diameter of the inlet retainer opening 43 upon insertion. The radially-outward spring force of the elastic retaining pin 20 as it expands to fill the inlet retainer opening 43 serves to retain the elastic retaining pin 20 within the inlet retainer opening 43 during use. As previously mentioned, the elastic retaining pin 20 has chamfers on both ends 20(1), 20(2) to facilitate starting the pin 20 into the inlet retainer opening 43. In some embodiments, the elastic retaining pin 20 is inserted into the inlet retainer opening 43 with the seam 20(3) of the coil facing away from the inlet fitting 50.

The coiled-type elastic retaining pin 20 fits tightly to the mating bore (e.g., inlet retainer opening 43), is self-aligning by its rolled shape and self-retaining from its stored spring forces. The elastic retaining pin 20 continues to flex after insertion when a load is applied to the elastic retaining pin 20 thus providing excellent performance to counters fatigue and/or reduces vibration in dynamic applications. In this application, the elastic retaining pin 20 absorbs energy of the axial loading of the inlet fitting 50 due to fuel pressure in general, and also due to pulsations in the fuel pressure.

Depending on the requirements of the specific application, the elastic retaining pin 20 can be permanently retained by deforming one or both ends of the inlet retainer opening 43. This "tamper proofing" may be desirable for field service situations.

In some embodiments, the fuel rail 32 is a monolithic structure in which the log 34, the injector cups 44 and the mounting bosses 33 are formed integrally from a single billet of metal. In some embodiments, the fuel rail 32 is formed integrally of metal in a forging process. In other embodiments, the fuel rail 32 may be machined from a single piece and/or manufactured using other processes such as, but not limited to, extrusion, casting, and injection molding. In still other embodiments, the fuel rail 32 may be formed of multiple pieces joined by brazing, welding or other methods.

Although the illustrated embodiments include a fuel rail 32 that supplies high pressure fuel directly to the cylinders of an engine via fuel injectors 80, the fuel rail 32 is not limited to be used in a high pressure, direct injection fuel delivery system. For example, in other embodiments, the fuel rail structure may supply fuel at relatively low pressure. In still other embodiments, the fuel rail structure may supply fuel to an accessory fuel distribution connection port or fuel dependent paths and components (such as pressure relief valves) to supply fuel to cylinders indirectly or return fuel to fuel tank.

In the illustrated embodiment, the inlet fitting 50 is used to provide a sealed, reliable connection between the fuel supply line 2 and a fuel rail 32. However, it is understood that the inlet fitting 50 has other applications, and can be used, for example, to provide a connection between a cross-over connection pipe (e.g., a pipe that connects two logs in a fuel injection system) and a fuel rail. In another example, the inlet fitting 50 may also be employed in fluid lines used in other (e.g., non-fuel and/or non-automotive) low or high pressure applications.

Selective illustrative embodiments of the fuel delivery system, connection assembly and its method of manufacture are described above in some detail. It should be understood that only structures considered necessary for clarifying the fuel delivery system, connection assembly and its method of manufacture have been described herein. Other conventional structures, and those of ancillary and auxiliary components of the fuel delivery system, connection assembly and its method of manufacture, are assumed to be known and understood by those skilled in the art. Moreover, while working examples of the fuel delivery system, connection assembly and its method of manufacture have been described above, the fuel delivery system, connection assembly and its method of manufacture are not limited to the working examples described above, but various design alterations may be carried out without departing from the fuel delivery system, connection assembly and its method of manufacture as set forth in the claims.

We claim:

1. A fitting connection assembly for use in a fluid delivery system, comprising:
    a first body, the first body including
        a bore that is coaxial with a first axis, and
        a retainer opening that extends coaxially with a second axis, the second axis being perpendicular to the first axis and offset relative to the first axis;
    a second body, the second body including
        an insertion portion that is disposed in the bore,
        a fluid passage that extends through the insertion portion and communicates with the bore, and
        an outer surface having a channel; and
    a retaining pin that retains the insertion portion within the bore, the retaining pin including
        a pin first end,
        a pin second end that is opposite the pin first end, and
        a pin longitudinal axis that extends through the pin first and second ends,
wherein
    the retaining pin is disposed inn the retainer opening such that a portion of the retaining pin resides in the channel,
    the retaining pin is elastically expandable and contractible in a direction perpendicular to the pin longitudinal axis,
    the first body is a fuel rail,
    the second body is an inlet fitting of the fuel rail, and
    the channel is linear.

2. The fitting connection assembly of claim 1, wherein the retaining pin conforms to the dimensions of the retainer opening.

3. The fitting connection assembly of claim 1, wherein a radially-outward spring force of the retaining pin serves to retain the retaining pin within the retainer opening.

4. The fitting connection assembly of claim 1, wherein the retaining pin is self-retaining with respect to the retainer opening.

5. The fitting connection assembly of claim 1, wherein the retaining pin is a spring pin.

6. The fitting connection assembly of claim 1, wherein the retaining pin is a coiled spring pin having more than one coil when in an unloaded state, the more than one coil encircling the retaining pin longitudinal axis.

7. The fitting connection assembly of claim 1, wherein the retaining pin damps vibration of the fitting connection assembly.

8. The fitting connection assembly of claim 1, wherein the channel is aligned with the retainer opening.

9. The fitting connection assembly of claim 1, wherein
    the first body includes a second retainer opening that is parallel to the retainer opening and is disposed on an opposed side of the first axis relative to the retainer opening,
    the outer surface has a second linear channel,
    the fitting connection assembly further comprises a second retaining pin that is disposed in the second retainer opening and in the second linear channel such that the second retaining pin retains the insertion portion within the bore.

10. A fuel rail assembly comprising a fuel rail, an inlet fitting and a retaining pin that retains the inlet fitting in an inlet passageway of the fuel rail, wherein
    the fuel rail comprises:
        a main fuel passage;

an inlet disposed at one end of the main fuel passage, the inlet including the inlet passageway that permits communication between the environment and the main fuel passage, the inlet passageway and the main fuel passage being coaxial with a first axis; and a retainer opening that is coaxial with a second axis that is perpendicular to the first axis, the retainer opening disposed in the inlet, the inlet fitting comprises:

a leading end disposed in the inlet passageway;

a trailing end opposite the leading end and disposed outside the fuel rail, the trailing end including an external thread that is configured to engage an internal thread of a fluid delivery line;

a fitting longitudinal axis that extends between the leading end and the trailing end;

a fitting through passage that is co-linear with the fitting longitudinal axis and extends between the leading end and the trailing end, the fitting through passage communicating with the inlet passageway;

a channel that is parallel to the second axis, and a seal that surrounds the leading end and provides a fluid tight seal between the inlet fitting and a surface of the main fuel passage;

and wherein, the retaining pin is disposed in the retainer opening such that a portion of the retaining pin resides in the channel whereby the retaining pin retains the inlet fitting within the inlet passageway of the fuel rail, and the retaining pin is elastically expandable and contractible in a direction perpendicular to the second axis.

11. The fuel rail assembly of claim 10, wherein the retaining pin is a coiled spring pin having more than one coil when in an unloaded state, the more than one coil encircling a longitudinal axis of the retaining pin.

12. The fuel rail assembly of claim 10, wherein the retaining pin damps vibration of the fuel rail assembly.

* * * * *